Figure 1:
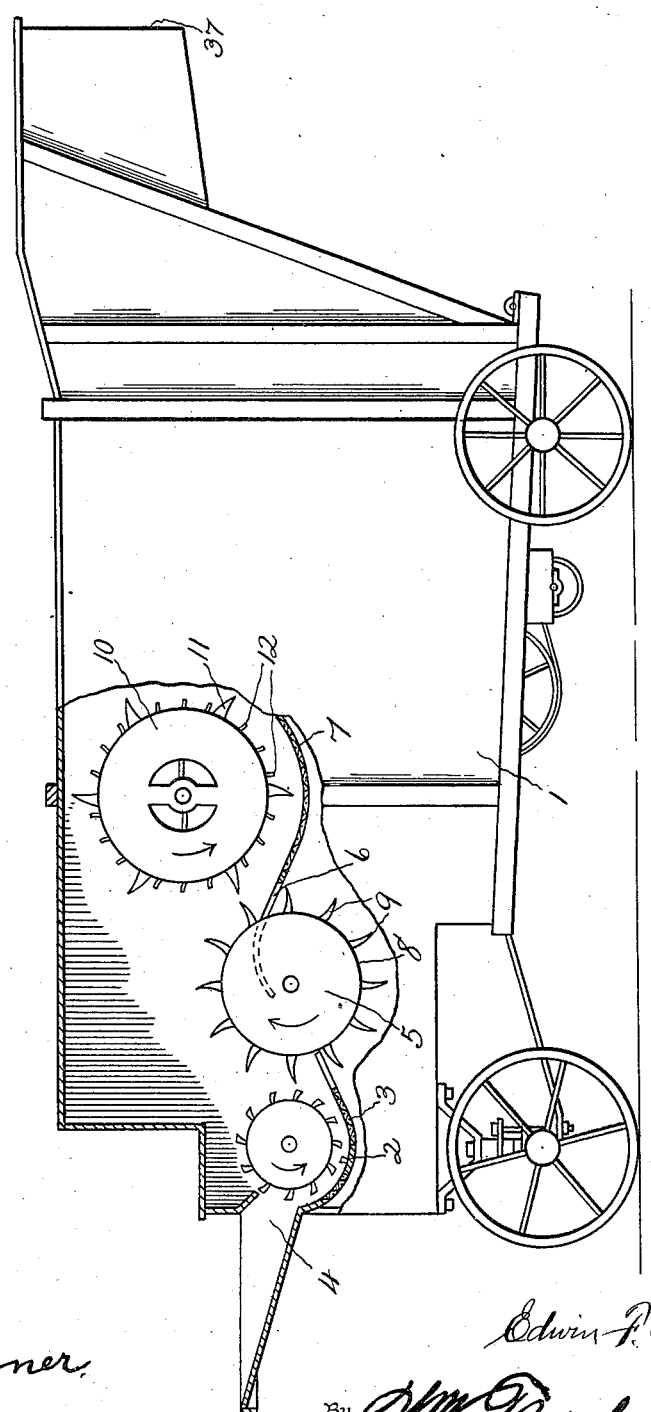

E. F. RICHMOND.
THRESHING MACHINE.
APPLICATION FILED OCT. 2, 1911.

1,013,816.

Patented Jan. 2, 1912.
3 SHEETS—SHEET 1.

Witnesses
R. S. Trogner
A. T. Kitchin

Inventor
Edwin F. Richmond
By Wm. Fletcher & Co.
Attorneys

E. F. RICHMOND.
THRESHING MACHINE.
APPLICATION FILED OCT. 2, 1911.
1,013,816.
Patented Jan. 2, 1912.
3 SHEETS—SHEET 2.
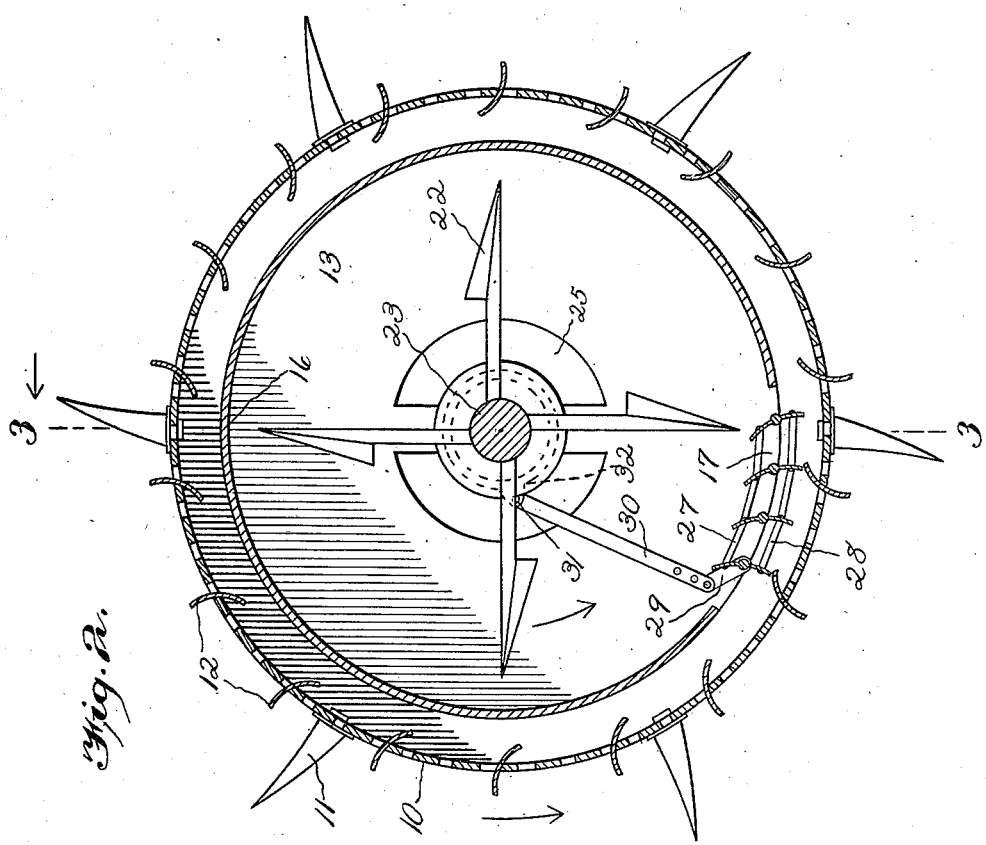
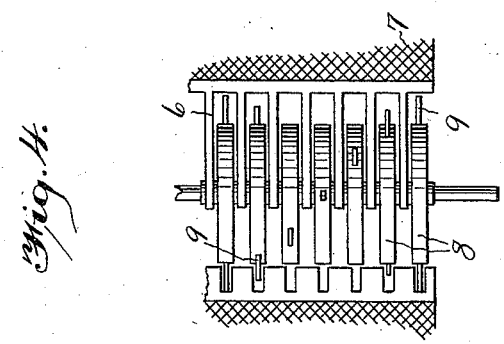

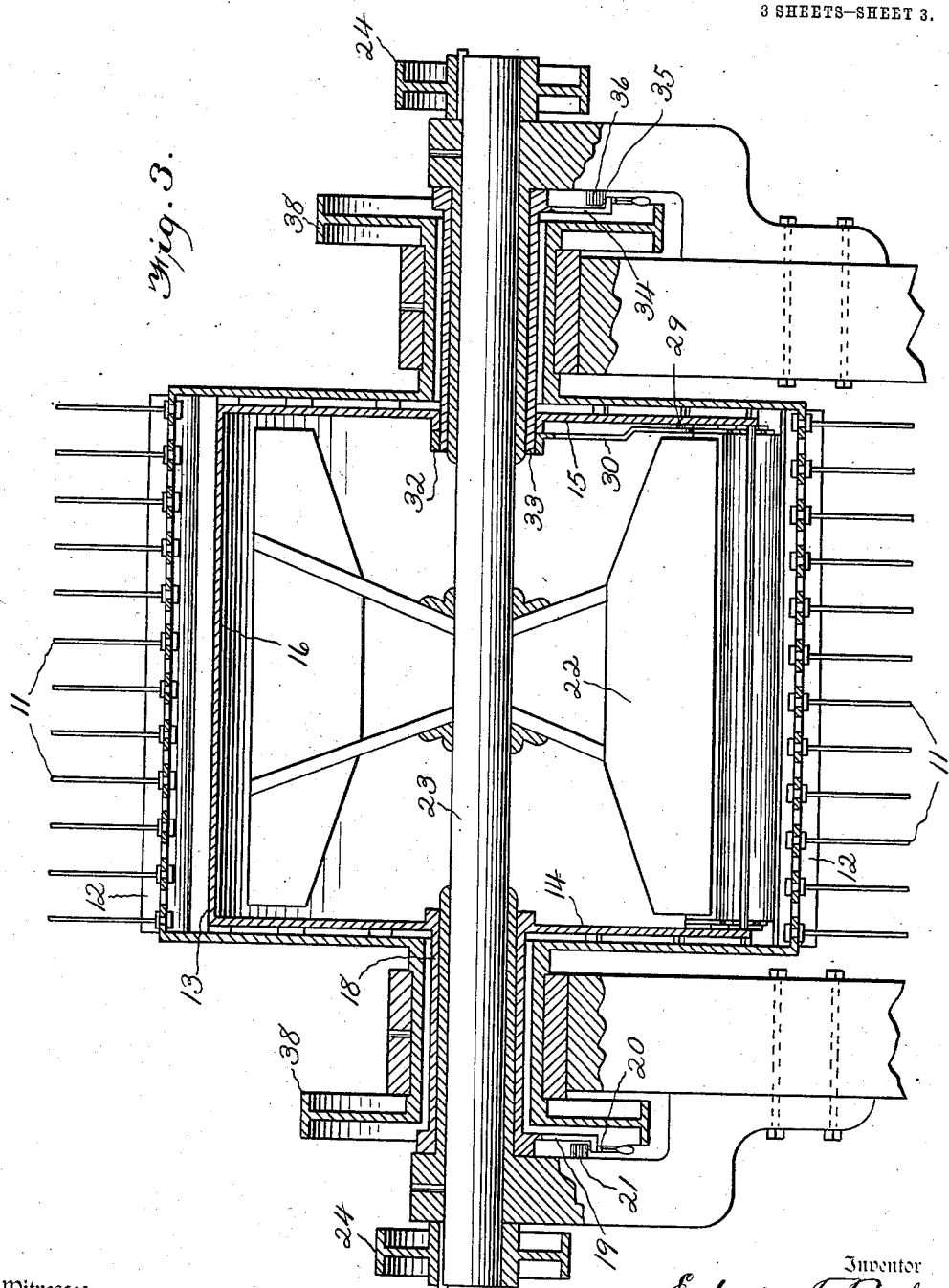

UNITED STATES PATENT OFFICE.

EDWIN F. RICHMOND, OF LAKE CHARLES, LOUISIANA.

THRESHING-MACHINE.

1,013,816.      Specification of Letters Patent.      Patented Jan. 2, 1912.

Application filed October 2, 1911. Serial No. 652,349.

*To all whom it may concern:*

Be it known that I, EDWIN F. RICHMOND, a citizen of the United States, residing at Lake Charles, in the parish of Calcasieu and State of Louisiana, have invented certain new and useful Improvements in Threshing-Machines, of which the following is a specification.

This invention relates to improvements in threshing machines, and particularly to means for cleaning the grain or other matter being threshed.

The object in view is the arrangement of an improved picker device associated with improved means for directing a blast of air against the grain being threshed immediately after the same leaves the picker for removing the grain.

A further object of the invention is the arrangement of an improved picker designed to separate or pick to pieces grain and spread the same in an even sheet, the picker being associated with means for forcing a blast of air against the grain while spread in a sheet so as to remove the chaff and grain therefrom.

A still further object in view is the arrangement of a picker device and means for forcing air against the grain after the same leaves the picker device formed with regulating mechanism for controlling the amount of air used and the direction in which it is forced so as to secure maximum results by causing the air blast to engage or pass through the grain at the most advantageous stage of its movement through the threshing machine.

With these and other objects in view the invention comprises certain novel constructions, combinations, and arrangement of parts as will be hereinafter more fully described and claimed.

In the accompanying drawings: Figure 1 is a side view of a threshing machine with certain parts broken away for more clearly disclosing one embodiment of the invention. Fig. 2 is an enlarged vertical section through a spreading drum and an air supplying device, the same embodying certain features of the invention. Fig. 3 is a section through Fig. 2 on line 3—3. Fig. 4 is a top plan view of the picker and associated parts.

In constructing a device embodying the invention it is aimed to provide means which will receive grain on the stalk and in bundles if necessary, and pick or separate the same. The separation is carried on to the extent of spreading the straw or stalks of grain in a thin sheet and then forcing rearward to a final discharge point. As the straw is spread out into the thin sheet mentioned a current of air is caused to pass through the same and forces the grain downward to separating means of any desired kind which separates the grain from the chaff and other light matter.

In order that the invention may be more clearly understood an embodiment of the same is shown in the accompanying drawings in which 1 indicates the body of a threshing machine of any desired structure, and provided with the usual fans and other separating devices for separating the grain after being threshed from the chaff and other foreign matter. The body 1 carries the usual threshing drum or cylinder 2 which is provided with a screen member 3 for permitting the grain and some of the chaff to pass through, but is adapted to prevent the stalks of the grain from passing through. The grain is fed into the machine through opening 4, either in bundles or somewhat spread out as may be desired, and the cylinder or drum 2 picks the bundles of grain to pieces to a certain extent and threshes the same for removing the heads from the stalks. After the stalks of the grain have passed from drum 2 the same are engaged by a picker device 5 which lifts the straw or stalks of grain and deposits the same upon fingers 6 from which they pass in a slightly downward direction to a screening 7. The picker 5 is preferably formed of a plurality of disks 8, each disk being provided with teeth 9. The disks 8 are spaced apart in order that the fingers 6 may project therebetween for receiving and guiding the straw on to the screening 7. The picker 5 is designed to operate at a higher rate of speed than the drum 2 so that the straw is removed from the screen member 3 in comparatively small bundles or lots, so that the straw is fed to fingers 6 and screening 7 in a comparatively thin continuous stream.

Associated with and co-acting with picker 5 is a rotating drum 10 which is formed with a plurality of teeth 11. Drum 10 is rotated at a higher rate of speed than picker 5 so that as the straw is brought over and deposited upon fingers 6 the same is spread out in a thin sheet over screening 7 and moved over said screening until finally deposited upon conveying means for transporting the straw out of the body 1. Drum 10 is preferably made comparatively open, but if desired may be formed of perforated sheet metal. In order to properly guide the air, drum 10 is formed with a plurality of blades 12 rigidly secured in place and rotatable with the drum.

Arranged in drum 10 is an air drum 13 which is provided with ends 14 and 15 (Fig. 3). These ends are formed solid and the outer shell 16 is also formed solid, except at point 17, which is left open. End 14 of drum 13 is formed integral with sleeve 18. Sleeve 18 has rigidly connected therewith an arm or lever 19 provided with a manually operated catch 20, which catch is adapted to engage a segmental rack 21 for locking the lever or arm 19 in any desired position. By this construction and arrangement when it is desired to shift the position of opening 17 of drum 13, lever 19 is moved and catch 20 is caused to engage rack 21 at the desired point for locking the drum 13 in its adjusted position. The fan 22 is rigidly secured to axle 23 which axle is rotated by pulley 24 which receives power from any desired source, the same being preferably connected up with some of the power pulleys of the threshing machine. When the device is in operation fan 22 is being rotated, and draws in air through eye 25 and forces the air out opening 17. In order to regulate the air passing through opening 17, and to direct the air to the desired point a plurality of pivotally mounted shutters or guides 27 are arranged in opening 17. The shutters or guides 27 are connected by suitable links 28 so that the same will all operate together. One of the shutters 37 is provided with an arm 29 to which a link 30 is adjustably connected. When link 30 is moved longitudinally the shutters or guides 27 will be moved accordingly, either to an open or closed position or some intermediate position. Link 30 is pivotally connected at 31 to a lug 32 rigidly connected with or formed integral with sleeve 33. Sleeve 33 is loosely mounted on shaft 23 and has rigidly connected therewith an operating arm or lever 34 which carries a catch 35 adapted to engage a segmental rack 36. When it is desired to shift the position of the shutters 27 lever 34 is shifted to the desired extent and movement will be conveyed from thence to the shutters. It will be noted that in connection with levers 34 and 19 that the same are arranged exteriorly of the drum so that the shutters and the drum will be adjusted without any difficulty. Lever 19 is designed to shift bodily the drum 13, and consequently shift the position of opening 17, while arm or lever 34 is simply provided for adjusting or regulating the position of the shutters or guides 27.

In operation the grain with its stalks is fed into the body 1 through opening or mouth 4, and the stalks or straw caused to travel continuously through the machine, and finally out the discharge end 37. The grain is removed from the stalks as the same pass drum 2, picker 5, and drum 10. In addition to the grain being removed the chaff and other light matter is also removed. The grain, however, is winnowed in the usual manner so that the chaff and other light material is forced out the body 1 at one place, while the grain proper is removed at another place. It will be understood that the picker 5 may be connected with drum 2 by a belt or other means, or connected to some other part of the machine so as to rotate at the proper speed. Drum 10 is provided with pulleys 38 which are designed to receive belts, and consequently receive power from any desired part of the machine so as to rotate at the required speed.

What I claim is:

1. In a device of the character described, the combination in a threshing machine structure, of a picker device, means for spreading matter from said picker device, means for forcing a blast of air through the the matter while in a spread condition, and a plurality of adjustable shutters arranged in the path of said air blast for controlling the same.

2. In a device of the character described, the combination in a threshing machine structure, of a drum for spreading grain, a screen for supporting the grain while in a spread condition, a fan, a housing for said fan formed with an opening for directing the air blast from the fan toward said screen, and a plurality of pivotally adjustable shutters arranged in said opening.

3. In a device of the character described, the combination in a threshing machine, of means for spreading grain, means for forcing an air blast through said grain, a housing surrounding said last mentioned means formed with an opening through which said air blast passes, a plurality of pivotally mounted shutters arranged in said opening and designed to be moved for closing to any desired extent said opening, means connecting all of said shutters for causing the same to act simultaneously, a controlling lever, and a plurality of means connecting said controlling lever and said shutters, whereby said controlling lever may adjust the shutters as desired.

4. In a device of the character described, the combination in a threshing machine structure, of a picker drum, a screening arranged at one side of the picker drum, a spreading drum adapted to take the grain from said picker drum and spread the same in a sheet over said screening, a fan for creating a blast of air, and a plurality of guiding shutters arranged to guide said blast of air so that the same will pass through said screening and the grain thereon in a direction at substantially right angles to the travel of the grain.

5. In a device of the character described, the combination in a threshing machine structure, of a picker drum, means for receiving straw from the picker drum, a spreading drum for forcing straw from the picker drum to said means for receiving the straw, a fan, a housing for said fan formed with a discharge opening, a plurality of guiding shutters arranged in said discharge opening for guiding air from said fan so that the same will pass through said straw after the same has been spread, and means for adjusting the angle of said guiding shutters.

6. In a device of the character described, the combination in a threshing machine structure, of a picker drum, means for feeding straw from said picker drum, a fan for forcing a blast of air through said straw, a plurality of guiding shutters for guiding said blast of air, an adjusting link connected with said shutters for adjusting the position thereof, and consequently regulating the angle at which said blast is forced against said straw, a sleeve connected with said adjusting links, and an adjusting lever connected with said sleeve for shifting the position thereof and eventually causing said link to adjust the position of said guiding shutters.

In testimony whereof I affix my signature in presence of two witnesses.

EDWIN F. RICHMOND.

Witnesses:
W. H. THOMPSON,
D. A. LEVEGUE.

---

Copies of this patent may be obtained for five cents each, by addressing the "Commissioner of Patents, Washington, D. C."